(12) United States Patent
Thomson et al.

(10) Patent No.: US 11,964,463 B1
(45) Date of Patent: Apr. 23, 2024

(54) SEALED REINFORCED TAPE

(71) Applicant: Air Cruisers Company, LLC, Wall Township, NJ (US)

(72) Inventors: Christian W. Thomson, Manasquan, NJ (US); Thomas W. Swierkocki, Manasquan, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 729 days.

(21) Appl. No.: 16/504,962

(22) Filed: Jul. 8, 2019

Related U.S. Application Data

(60) Provisional application No. 62/696,380, filed on Jul. 11, 2018.

(51) Int. Cl.
| | |
|---|---|
| *B32B 7/12* | (2006.01) |
| *B32B 3/14* | (2006.01) |
| *B32B 5/02* | (2006.01) |
| *B32B 27/08* | (2006.01) |
| *C09J 7/29* | (2018.01) |

(52) U.S. Cl.
CPC ............... *B32B 7/12* (2013.01); *B32B 3/14* (2013.01); *B32B 5/02* (2013.01); *B32B 27/08* (2013.01); *C09J 7/29* (2018.01); *B32B 2260/021* (2013.01); *B32B 2262/02* (2013.01); *B32B 2262/101* (2013.01); *B32B 2262/106* (2013.01); *B32B 2405/00* (2013.01); *C09J 2301/122* (2020.08)

(58) Field of Classification Search
CPC ......... B32B 3/14; B32B 5/02; B32B 2262/02; B32B 2262/021; B32B 2262/101; B32B 2262/106; B32B 2405/00; C09J 7/29; C09J 2301/122; B63C 9/04; B63C 9/1255; B63C 2009/042; B63C 9/22; B64D 25/14; B64D 25/18; B64D 11/0631; B63B 2027/145; B63B 7/08; F17C 2270/0772; E01D 15/122; A62B 1/20; A41D 13/018; A41D 13/0155
See application file for complete search history.

(56) References Cited

U.S. PATENT DOCUMENTS

| | | | | |
|---|---|---|---|---|
| 1,456,168 | A * | 5/1923 | Witmer | B63C 9/04 182/139 |
| 2,663,659 | A * | 12/1953 | Miller | E04H 15/20 383/3 |
| 5,186,987 | A * | 2/1993 | Imoto | B32B 5/26 264/269 |
| 6,110,565 | A * | 8/2000 | Matthews | B32B 27/12 428/196 |
| 6,581,334 | B2 * | 6/2003 | Oney | B64D 25/14 244/905 |

(Continued)

FOREIGN PATENT DOCUMENTS

WO    WO-2017151866 A1 *    9/2017  ............ B29C 70/16

*Primary Examiner* — Scott R. Walshon
(74) *Attorney, Agent, or Firm* — Kilpatrick Townsend & Stockton LLP

(57) ABSTRACT

Air-holding fabrics and improvements to reinforced tape used to join multiple fabric panels. Specifically disclosed is a joining system and method for securing two air-holding panels to one another, while eliminating air leakage through the seam tape. The disclosed reinforced tapes find particular use in connection with evacuation slides, evacuation slide/rafts, life rafts, life vests, and other life-saving inflatable devices.

17 Claims, 16 Drawing Sheets

(56) References Cited

U.S. PATENT DOCUMENTS

| | | | | |
|---|---|---|---|---|
| 8,158,236 B2* | 4/2012 | Liggett | ..................... | C09J 7/29 |
| | | | | 428/141 |
| 2003/0098558 A1* | 5/2003 | Steiner | ..................... | B63B 7/08 |
| | | | | 280/28.5 |
| 2007/0238381 A1* | 10/2007 | Brewer | ............ | B29C 66/81422 |
| | | | | 156/304.6 |
| 2009/0220726 A1* | 9/2009 | Liggett | ..................... | C09J 7/29 |
| | | | | 428/343 |
| 2016/0083068 A1* | 3/2016 | Crites | ..................... | B64B 1/14 |
| | | | | 244/31 |

* cited by examiner

SEALED REINFORCED TAPE

CROSS REFERENCE TO RELATED APPLICATIONS

This application is related to and claims priority benefits from U.S. Provisional Application Ser. No. 62/696,380, filed on Jul. 11, 2018, entitled "Sealed Reinforced Tape," the entire contents of which are hereby incorporated by this reference.

FIELD OF THE INVENTION

The field of this disclosure relates to air-holding fabrics and improvements to reinforced tape used to join multiple fabric panels. Specifically disclosed is a joining system and method for securing two air-holding panels to one another, while eliminating air leakage through the seam tape. The disclosed reinforced tapes find particular use in connection with evacuation slides, evacuation slide/rafts, life rafts, life vests, and other life-saving inflatable devices.

BACKGROUND

Federal aviation safety regulations require aircraft to provide evacuation and other safety provisions for passengers. These include evacuation slides, evacuation slide/rafts, life rafts, life vests, and other life-saving inflatable devices. Relevant inflatable products that can be improved using the reinforced tapes of the present disclosure can include evacuation slides, evacuation slides/rafts, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air- or gas-holding functions. These inflatable devices are generally built from an assembly of inflatable tubular structures that form airbeams that are sealed to one another. Inflatable escape slides and life rafts also have non-air-holding features, such as patches, floors, sliding surfaces, girts, handles, and other features.

Typically, in order to form the tubular structures, many pieces of fabric (which may be referred to herein as panels) are joined together. Safety regulations set strength requirements for the fabric itself (the field of the inflatable tube), as well as strength requirements for the seam areas. In order to keep the inflation gas inside the tubes for long durations, the seams must be sealed together (via adhesive bonding or thermal welding methods) to make them leak proof. An example illustrating various types of seam areas on an evacuation slide is illustrated by FIG. 16.

The result of welding fabric panels is a seam that has a seam peel strength. Common regulations require a seam peel strength that is greater than about 5 pounds per inch. Other requirements of the resulting seam include one or more of: a seam shear strength greater than 175 pounds per inch, tensile strength greater than 190 pounds per inch, and/or tear strength greater than 13 pounds per inch. The resulting seam that is formed should meet other current Technical Standard Order (TSO) requirements, which are the minimum performance standards for specified materials used on emergency inflatable products.

Currently, such seams must also meet minimum shear strengths of 175 lbs/inch (at room temperature) and 40 lbs/inch (at an elevated temperature of 140° F.). Such seams must have a peel strength of 5 lbs/inch (evacuation slides, evacuation slide/rafts and life rafts) and 10 lbs/inch (life preservers/vests). The requirements outlined herein are current requirements; it should be understood that the materials described by this disclosure may have various features modified in order to meet other requirements that may be set in the future or by different regulatory authorities.

Typically, in welding two air- or gas-holding panels to one another, a butt seam is used. The butt seam is then sealed with a reinforcing tape on the outside surface and with an air- or gas-holding film on the inside surface. FIG. 1 illustrates this current configuration. This figure shows two fabric panels 10 being secured with a reinforcement tape 12. The fabric panels 10 of the inflatable device and the reinforcement tape 12 are typically cut from a roll of fabric, which is generally coated only on the top and bottom surfaces. This cutting results in the panels and the reinforcing tape having unsealed edges at cut portions that expose the fibers of the inner substrate. FIG. 1 shows the reinforcement tape 12 with unsealed edges 14 where it is cut from a roll of fabric. Also shown is a strip of air-holding film 16, which is typically secured to the surface that will form the inside of the inflatable device. FIG. 2 illustrates the assembled construction.

In other examples, at seam intersections, the reinforcing tapes can be positioned to cross over the top of each other. One example of such a seam cross over is illustrated by FIGS. 12 and 13. This can form small gaps at the edges. Additionally, the unsealed edges of the panels (unsealed panel edges 36 are illustrated in FIG. 3 as seam edges that abut one another at the seam 28, which is labeled in FIG. 4) and unsealed edges 26 of the reinforcing tape allow air to travel through the internal substrate, which again, can result in leaks.

Current methods of addressing the issue of unsealed panel edges 36 and unsealed edges 26 of the reinforcing tape during adhesive bonding can generally involve applying adhesive and/or sealant around and/or over the seams or their perimeter after the panels have been adhesively bonded to one another. The general goal is to "caulk" or otherwise seal any air gap in the seam so that it is airtight. Other methods that have been used to seal the unsealed edges of the fabric or the reinforcement tape have included extrusion, coating, lamination, dip coating, laser cutting and/or sealing, and heat fusing.

Improvements to reinforced tape used to secure air-holding panels to one another are desirable.

SUMMARY

Anywhere there is exposed yarn or fabric substrate on the inside surface of an inflatable device, there is a potential for leaks. The present disclosure seeks to provide a reinforcing tape that can address these issues. According to certain embodiments of this disclosure, there may be provided a seam tape, comprising: a reinforcement tape portion; and an air-holding layer on at least an upper or lower surface or both of the reinforcement tape portion, the air-holding layer positioned to extend past side edges (or wrap around/encompass the cut edges) of the reinforcement tape portion. The seam tape may be used to weld at least two panels together. The seam tape may be positioned over a butt seam. The seam tape may be a laminate of the reinforcement tape portion and the air-holding layer to form a single strip. The seam tape may be first and second seam tapes, wherein the first seam tape is positioned along a longitudinal seam and wherein the second seam tape is positioned along a transverse seam in order to form a seam crossover.

There is also disclosed a seam tape comprising for an inflatable device, comprising: a plurality of reinforcing fibers; and an air-holding coating or film on both sides of the reinforcing fibers fully encapsulating the reinforcing fibers. The seam tape may be used to weld two panels together. The seam tape may be positioned over a butt seam. The seam tape may be a laminate of the reinforcement tape portion and the air-holding layer to form a single strip. The seam tape may be first and second seam tapes, wherein the first seam tape is positioned along a longitudinal seam and wherein the second seam tape is positioned along a transverse seam in order to form a seam crossover.

DETAILED DESCRIPTION

Figure 1:
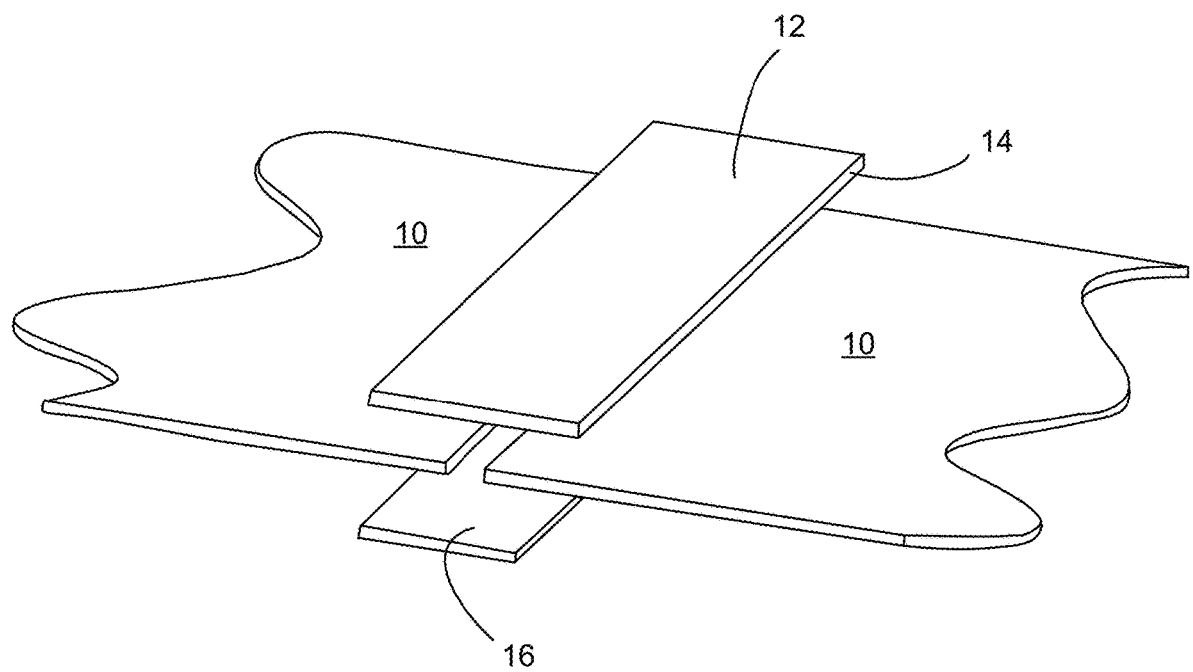
FIG. 1 shows a top perspective exploded view of a prior art seam tape, having a reinforcing tape on one side of the seam and an air-holding film on the opposite side of the seam.
Figure 2:
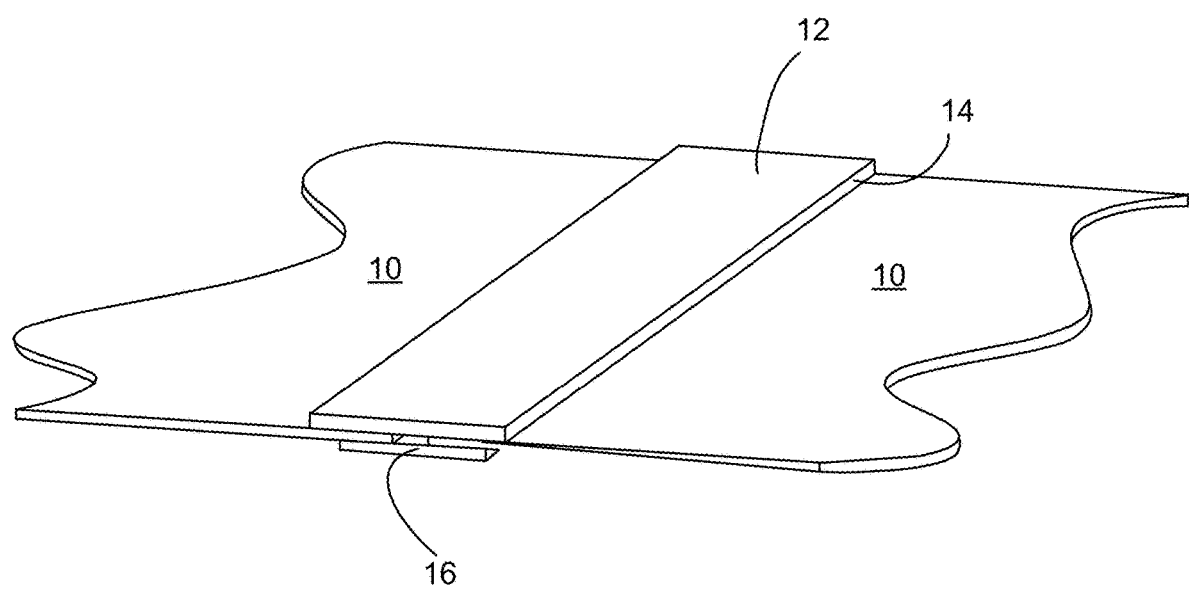
FIG. 2 shows a top perspective view of the assembled configuration of FIG. 1.

The present disclosure provides a solution that overcomes some of the deficiencies of the known art and the problems that remain unsolved. The disclosed seam tape 20 allows for the joining of two panels 10 with a welding machine using a seam tape 20 with sealed edges that does not require an additional film to make an airtight joint. The seam tape 20 is made up of a reinforcement tape portion 22 and an air-holding layer 24. The seam tape 20 may be referred to herein as a reinforced seam tape or as a laminate seam tape. The reinforcement tape portion 22 may be made of a plurality of reinforcement fibers. The air-holding layer 24 may be an air-holding film, an air-holding coating, or any other air-holding component or substance. Used together, the air-holding layer 24 seals both the unsealed side edges 26 of the reinforcement tape 22 and the unsealed side edges 36 of panels 10 providing a robust air- or gas-holding joint.

Figure 3:
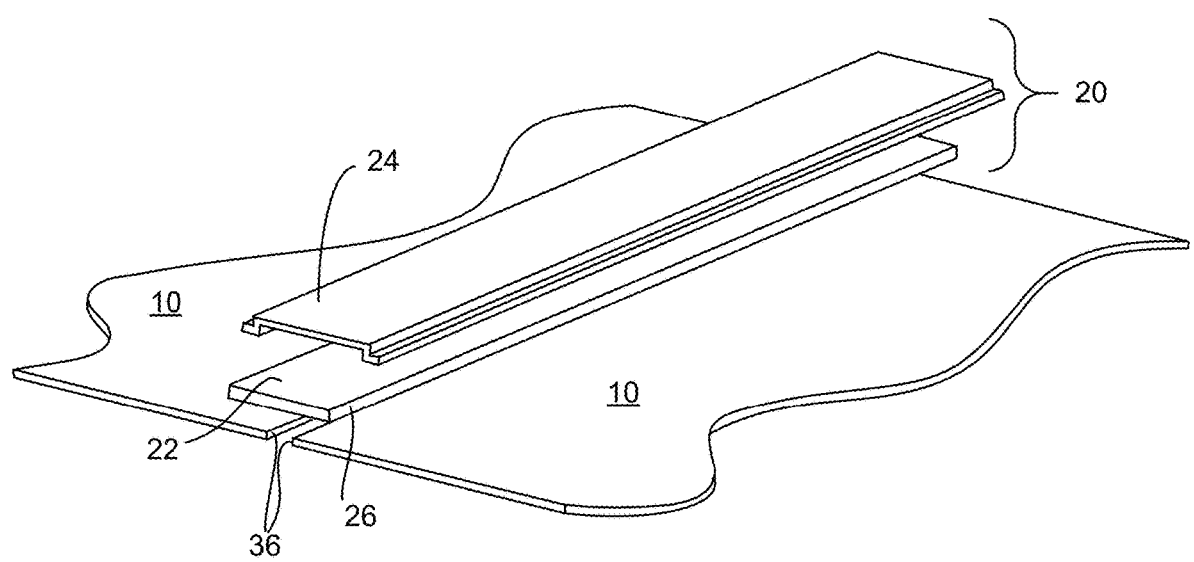
FIG. 3 shows a side perspective exploded view of one embodiment of a seam tape disclosed herein.
Figure 4:
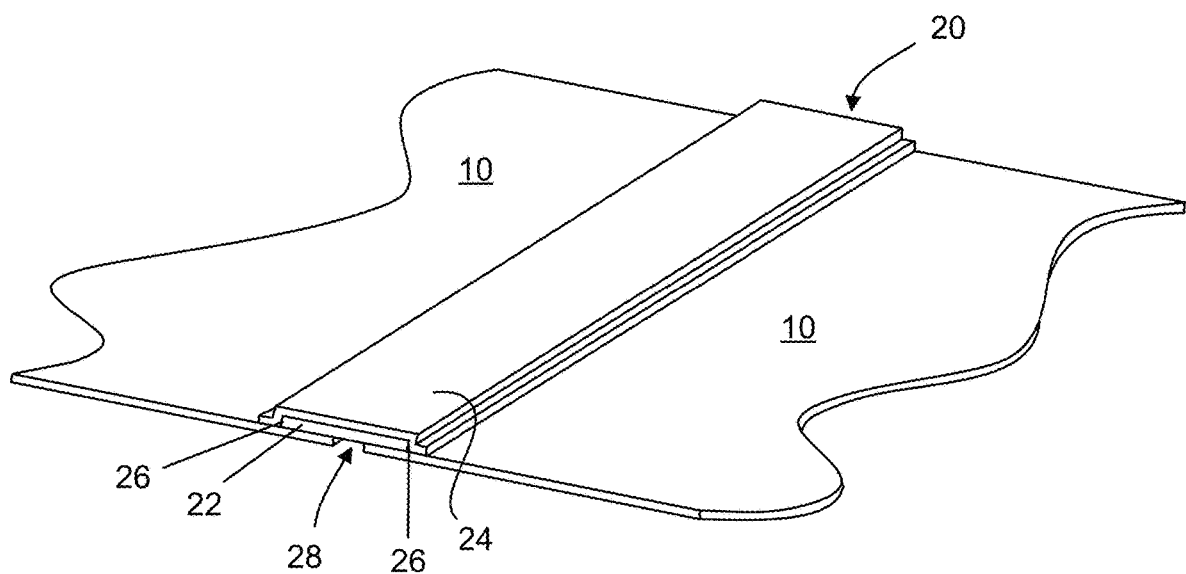
FIG. 4 illustrates a side perspective view of the assembled configuration of FIG. 3.
Figure 16:
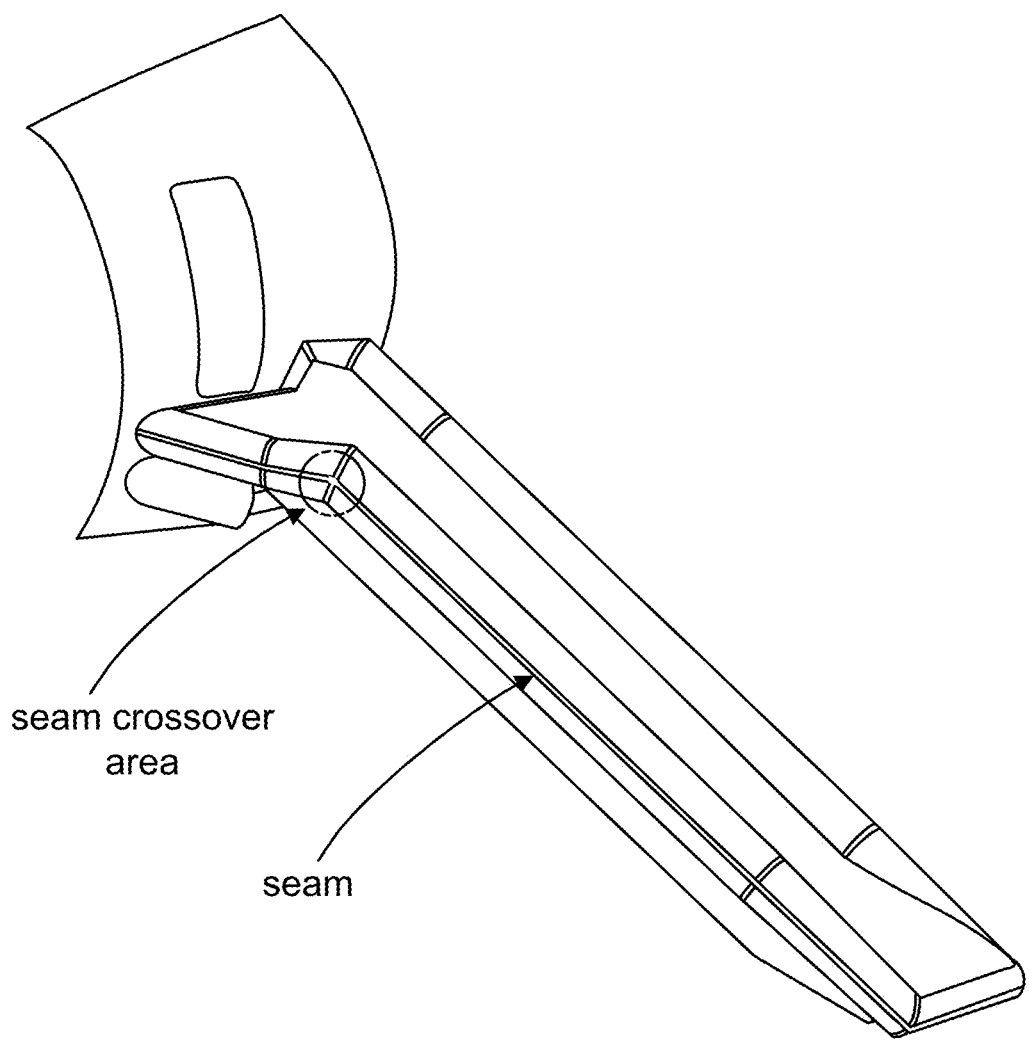
FIG. 16 illustrates an inflatable device incorporating the disclosed sealed reinforcement tapes.

In one embodiment, as illustrated by FIG. 3, two panels 10 may be secured to one another via seam tape 20. As shown, seam tape 20 includes a reinforcement tape portion 22 and an air-holding layer 24. The air-holding layer 24 is positioned so that it extends past unsealed side edges 26 of the reinforcing tape portion 22. This prevents the need for additional adhesive along the unsealed side edges 26. In use, the air-holding layer 24 provides a seal to the unsealed side edges 26 of the tape substrate. (It should be understood that FIGS. 3 and 4 show only a portion of the panel 10. Use of the panel 10 for forming an inflatable device typically involves forming a tubular structure out of the panel as illustrated by FIG. 16, such that the reinforcement tape portion 22 visible in FIG. 4 forms a continuous connection to form a tube, such that it is not an unsealed edge.) In practical application, the reinforcement tape portion 22 may be laid down along the seam opening 28, and the air-holding layer 24 may be laid down on top of the reinforcement tape portion 22. The air-holding layer 24 may be provided as having a greater width than the reinforcement tape portion 22 such that the air-holding layer 24 extends past the tape portion 22 on both side edges 26. In one embodiment, the air-holding layer 24 extends 0.1 inches past the tape portion 22. In another embodiment, the air-holding layer 24 extends 0.5 inches past the tape portion 22. Other lengths of extension are possible and considered within the scope of this disclosure, depending upon the particular inflatable design. Alternatively, the reinforcement tape portion 22 and the air-holding layer 24 may be laminated to one another to provide a single strip of seam tape 20, rather than forming the seam tape 20 in two separate portions. This may be referred to as a "laminated" seam tape. This single strip of seam tape 20 may be applied to the seam 28 in one step. FIG. 4 illustrates fabric panels 10 secured via the disclosed seam tape 20.

Figure 5:
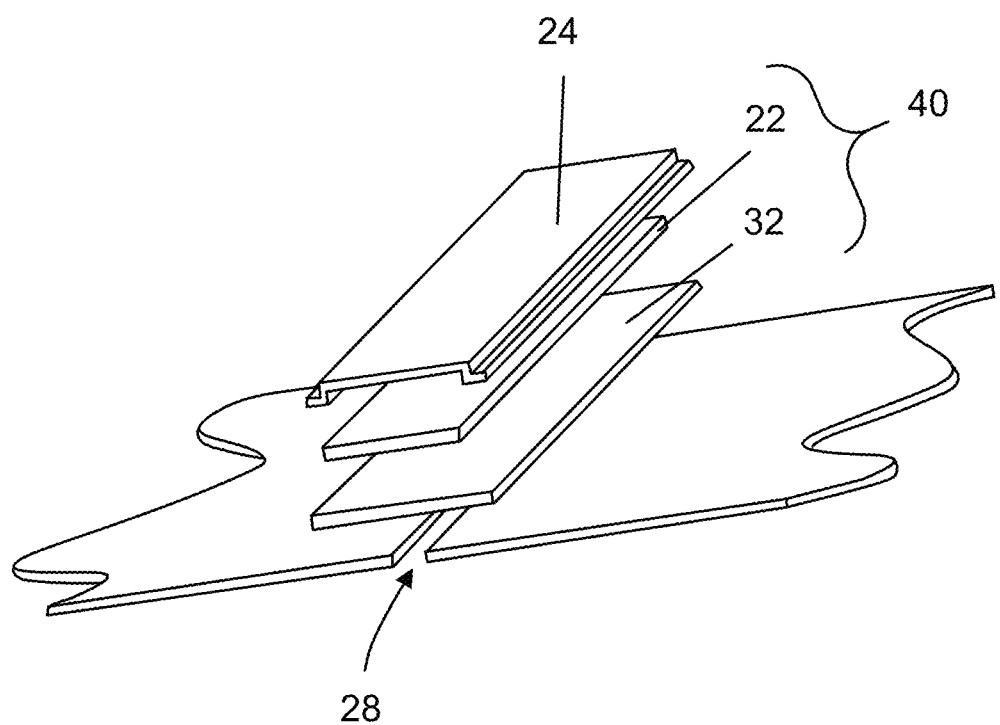
FIG. 5 shows a side perspective exploded view of an alternate embodiment of a seam tape disclosed herein.
Figure 6:
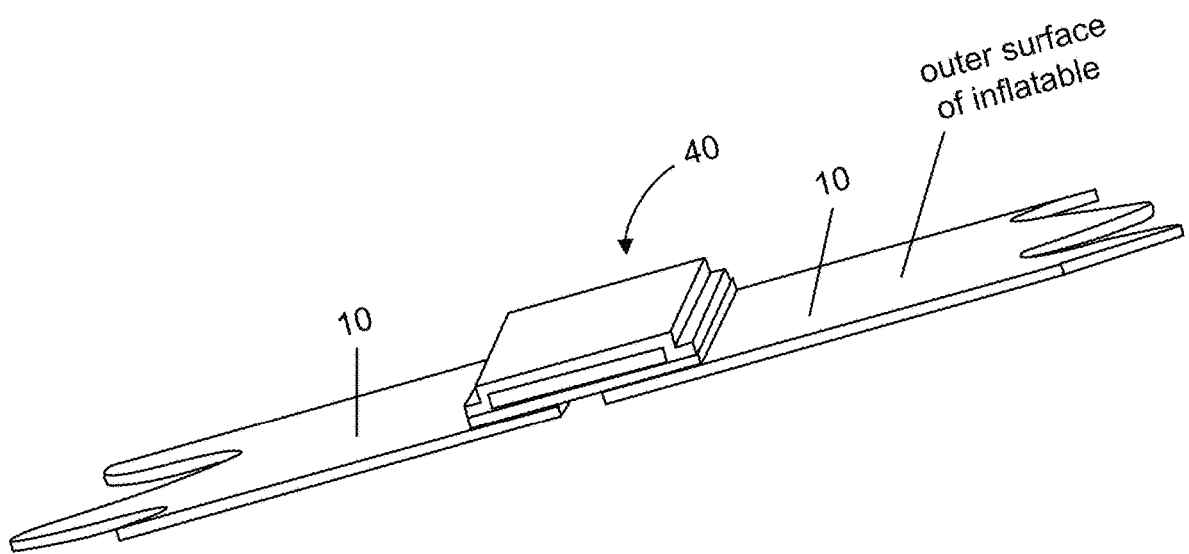
FIG. 6 illustrates a side perspective view of the assembled configuration of FIG. 5.
Figure 7:
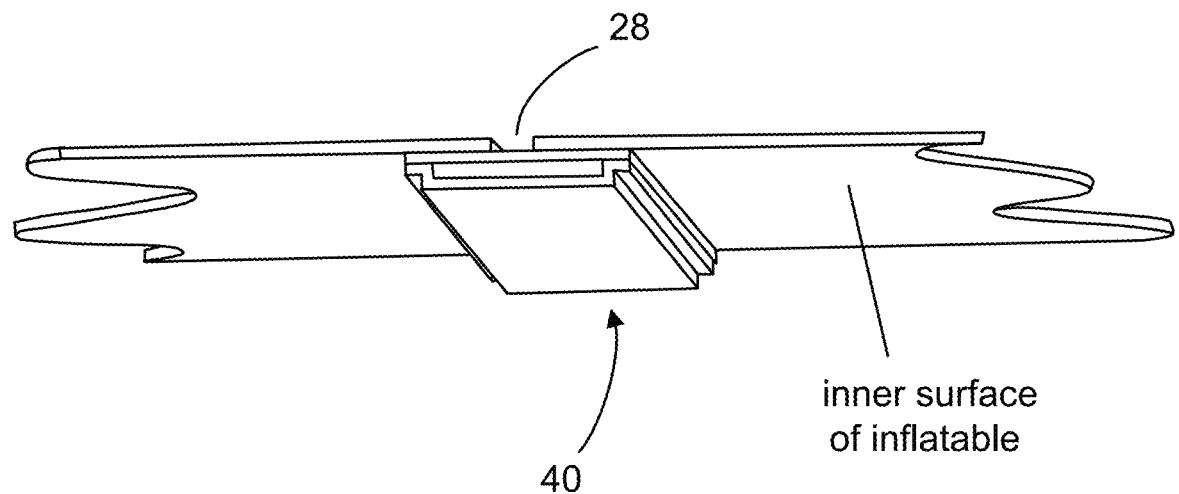
FIG. 7 illustrates that the seam tape may be positioned on the inside or the outside of the air-holding fabric.

FIG. 5 illustrates an alternate embodiment of seam tape 40 in which an air-holding layer is used as a base layer 32. In this example, the air-holding base layer 32 may be secured to the seam 28, then the reinforcement tape portion 22/air-holding layer 24 are applied as described above. Alternatively, the air-holding base layer 32, reinforcement tape portion 22, and the upper air-holding layer 24 may be laminated to one another to provide a single strip of laminate tape 40. FIG. 6 illustrates fabric panels 10 secured via the disclosed seam tape 40. FIGS. 6 and 7 illustrate that the disclosed seam tapes (20 or 40) may be used to secure a seam 28 either on an outer surface of an inflatable device or along an inner surface of an inflatable device. It should be understood that the seam tape 20 or 40 need not always be positioned on the side that is non-air-holding (which is typically the outside of the inflatable), but may be also positioned on a side that is air-holding (which is typically the inside of the inflatable). The location of the seam tape 20 or 40 may depend upon various manufacturing considerations.

Figure 8:
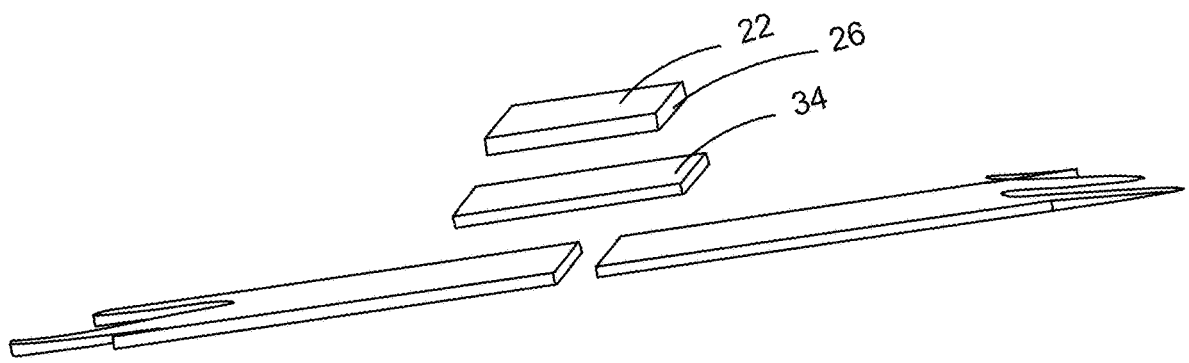
FIG. 8 shows a front perspective exploded view of a further embodiment of a seam tape disclosed herein.
Figure 9:
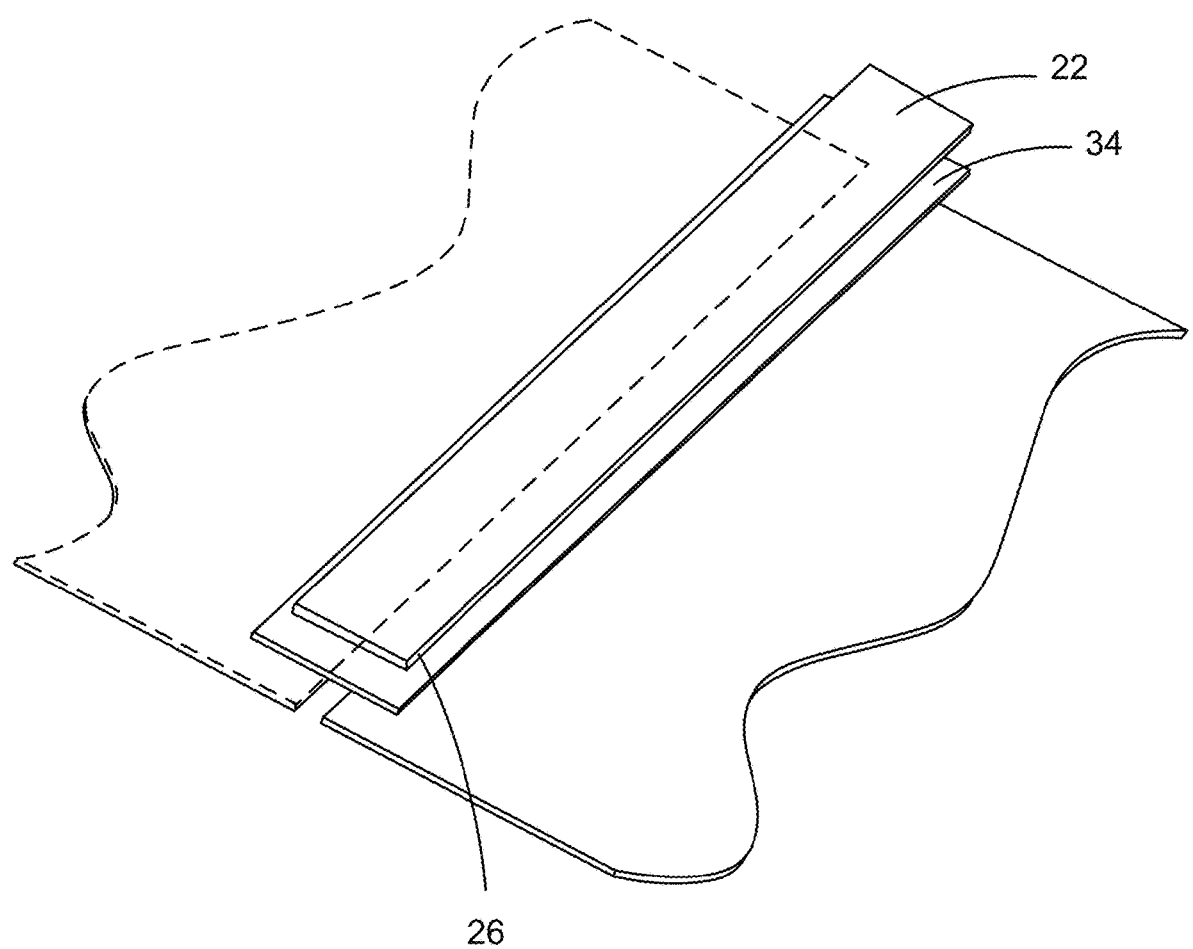
FIG. 9 illustrates a side perspective view of the assembled configuration of FIG. 8.

FIG. 8 illustrates an alternate embodiment in which an enlarged base layer 34 of an air-holding layer is used. As shown, the enlarged air-holding base layer 34 is designed to be wider than the reinforcement tape portion 22 that is positioned thereabove. This can be seen more fully by the assembled configuration of FIG. 9. In this embodiment, the unsealed side edges 26 of the reinforcement tape portion 22 are of no concern, because the tape portion 22 is positioned above the base layer of an air-holding layer 34. Accordingly, base layer 34 will prevent air leakage, and the reinforcement tape portion 22 is used for its structural properties only. It should also be understood that this alternate embodiment may be positioned on a non-air-holding or an air-holding side of the inflatable, similar to either embodiment of FIG. 6 or 7.

The present disclosure enables air-holding structures to be built more quickly. The reinforcing tape portion 22 and the air-holding layer may be secured together. The welding machine may have a rubber roller that applies pressure distributed over the entire seam tape 20.

Figure 10:
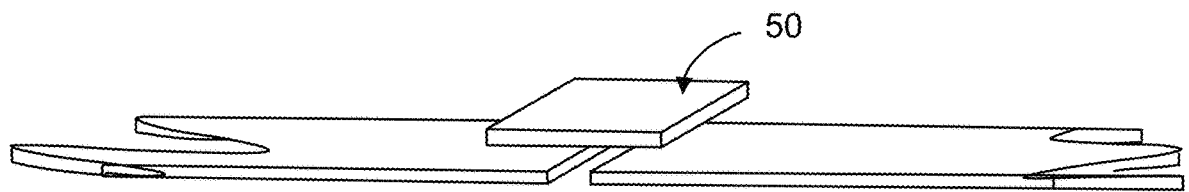
FIG. 10 shows a front perspective exploded view of a further embodiment of a seam tape disclosed herein.
Figure 11:
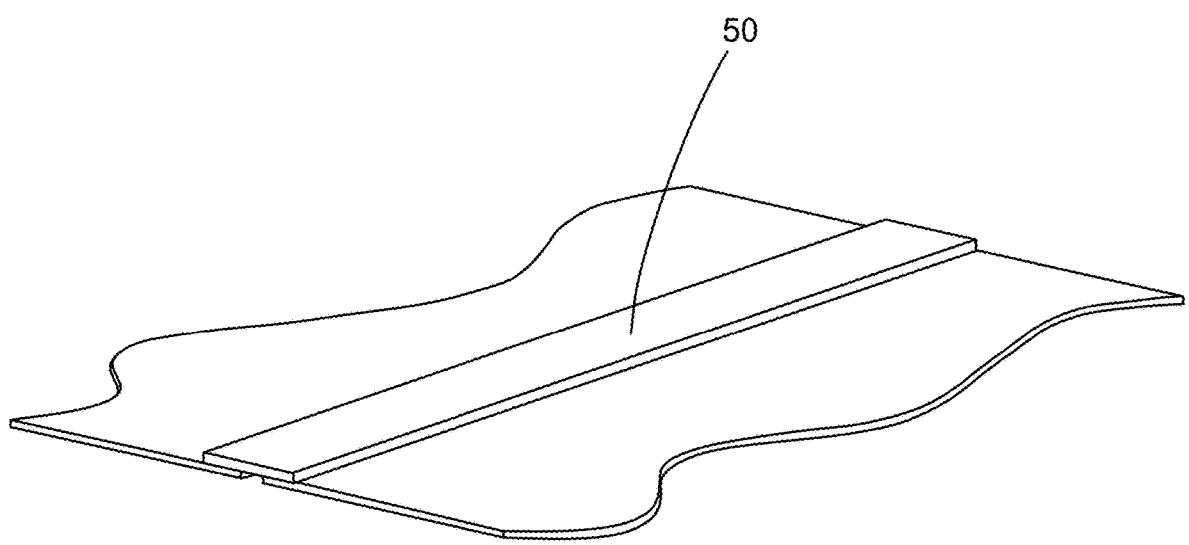
FIG. 11 illustrates a side perspective view of the assembled configuration of FIG. 10.

FIGS. 10-11 illustrate an alternate embodiment of a seam tape 50. This version provides a reinforcement tape portion that is pre-coated to be encased with an air-holding coating or film. In an alternate embodiment, it is possible to dip coat the reinforcement tape portion into a bath of material that has air-holding properties so that the tape is encased with an air-holding coating to provide a sealed edge. It should also be understood that this alternate embodiment may be positioned on a non-air-holding or an air-holding side of the inflatable, similar to either embodiment of FIG. 6 or 7.

Figure 12:
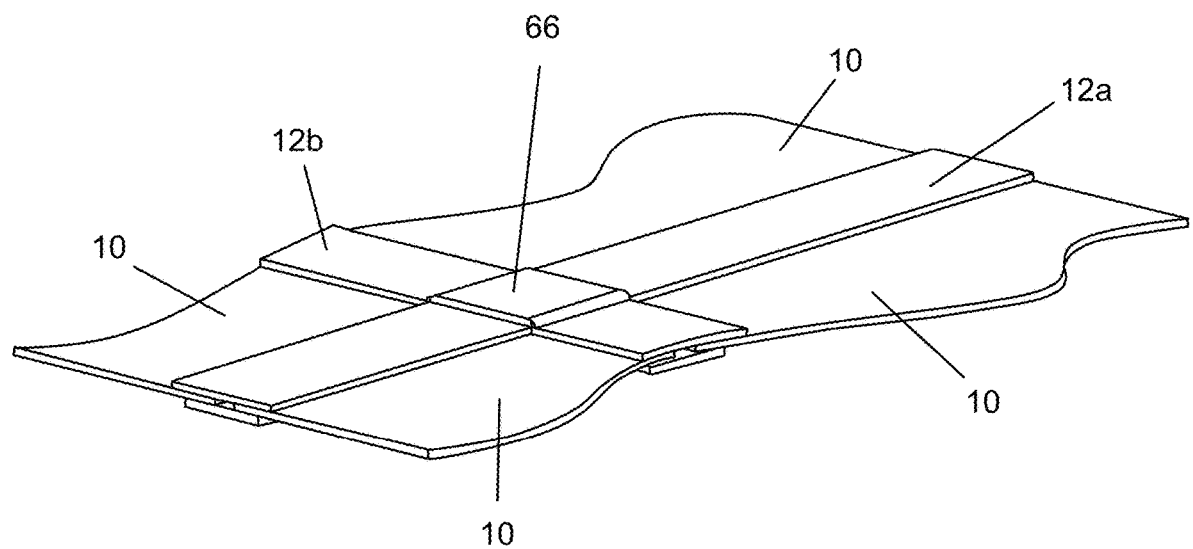
FIG. 12 illustrates a top perspective view of a typical seam crossover.
Figure 13:
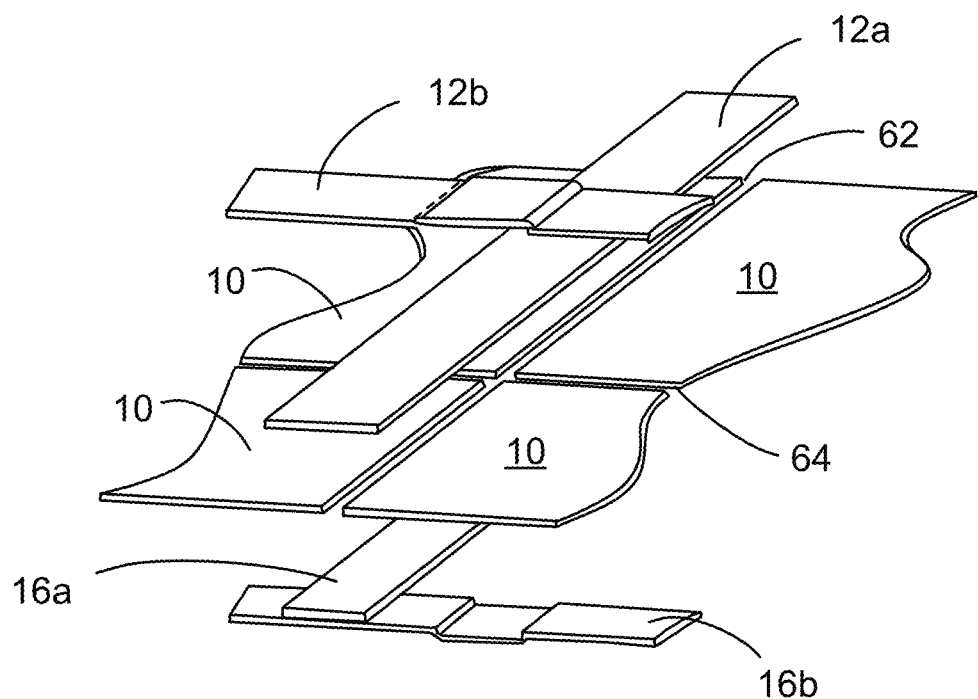
FIG. 13 illustrates an exploded view of FIG. 12.
Figure 14:
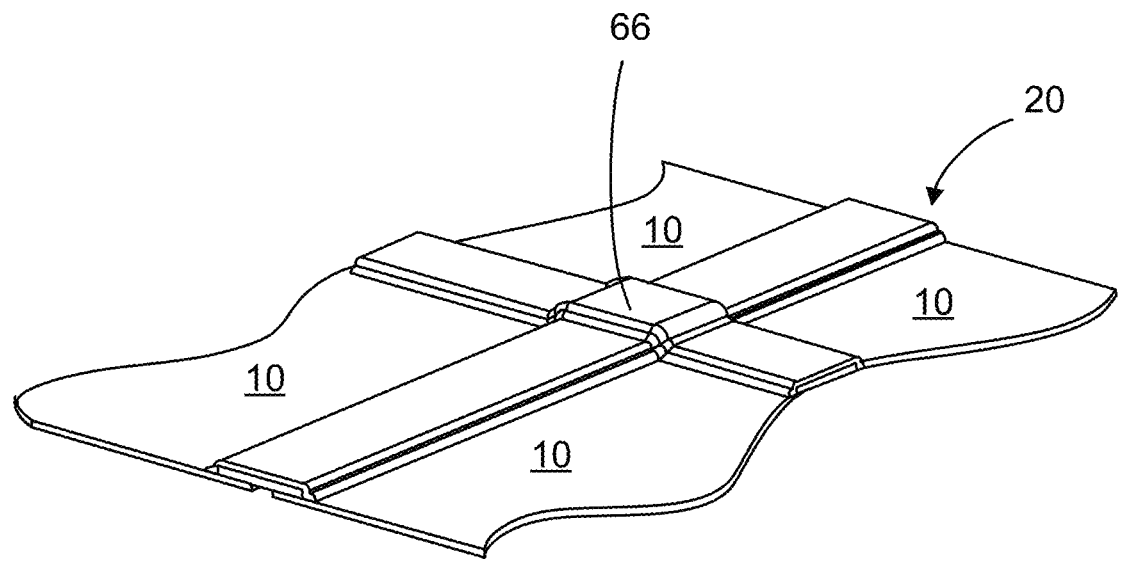
FIG. 14 illustrates a top perspective view of a seam crossover using the disclosed seam tape.
Figure 15:
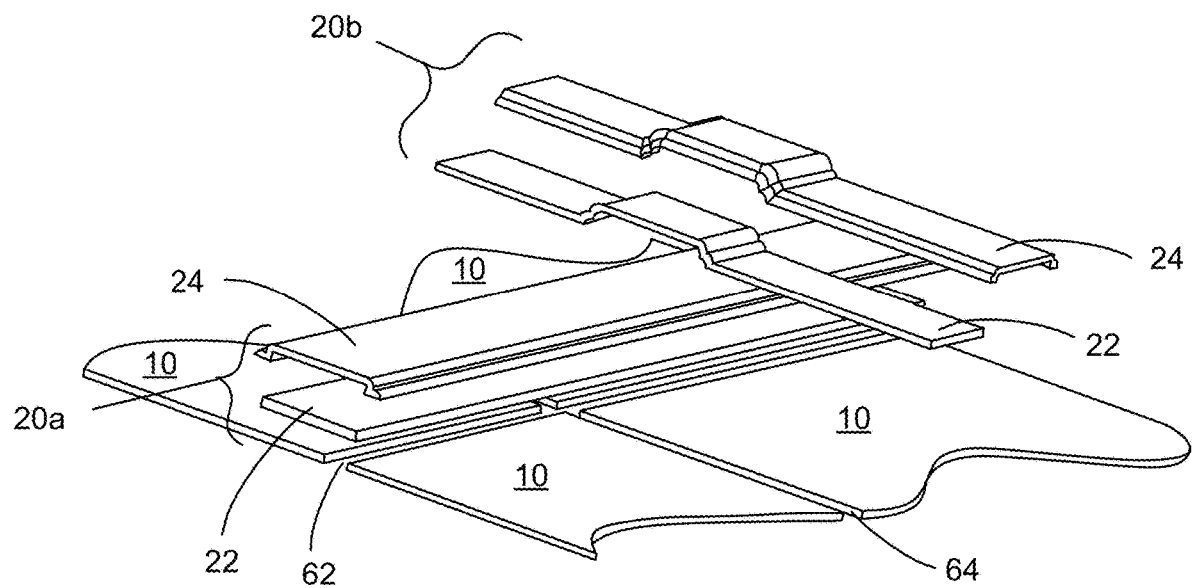
FIG. 15 illustrates an exploded view of FIG. 14.

The features described by this disclosure may also be used for seam crossovers. FIGS. 12-13 illustrate examples of typical current seam crossovers, and FIGS. 14-15 illustrate the disclosed seam tape used for an improved seam crossover. Referring now to FIGS. 14 and 15, there is shown four individual panels 10 being secured by two tapes 20. As shown in FIG. 13, a first tape 12a is applied to a longitudinal seam 62 and a second tape 12b is applied to a transverse seam 64. The tapes 12a and 12b cross over one another at junction 66, shown by FIG. 12. As described above, these tapes 12 may need to be sealed in order to prevent air from escaping the inflatable. Accordingly, an air-holding film 16 is shown positioned along an under surface of the panels 10. FIG. 13 illustrates an exploded view of this configuration. As shown, two air-holding films 16a and 16b are also used. Air-holding film 16a is applied to the opposite side of the longitudinal seam 62, and air-holding film 16b is applied transversely along the opposite side of the transverse seam 64. These films 16 prevent air from escaping the inflatable at seams 62 and 64.

FIGS. 14-15 illustrate a crossover seam using one or more of the embodiments of seam tape 20 disclosed herein. In these examples, four panels 10 are secured to one another using the disclosed seam tape 20 (or the alternate embodiment seam tape 20 described, in which the reinforcement tape portion 22 and air holding film portion 24 are laminated to one another to provide a single strip, or the seam tape 40 option with an additional base layer 32). As illustrated by the exploded view of FIG. 15, the longitudinal seam 62 is secured via an initial reinforcement tape portion 22. An air-holding film portion 24 is secured over the initial reinforcement tape portion 22. (It should also be understood that this seam tape may be provided as a pre-laminated structure provided as a single strip, rather than two layers, such as the disclosed laminate seam tape.) This ensures that the reinforcement tape portion 22 is fully air sealed to prevent air leakage. Rather than needing to provide any films along an under surface of the panels, the seam tape 20 is airtight by applying seam tape to only one side of the panels 10. The seam tape applied to the longitudinal seam 62 may be referred to as a first seam tape 20a. In order to seal the transverse seam 64, a second seam tape 20b is applied over the first seam tape 20a. The second seam tape 20b is similar in structure to the first seam tape 20a. These seam tapes 20a and 20b may cross over one another at junction 66. FIG. 16 illustrates an exemplary seam crossover area on an inflatable evacuation slide.

In summary, the present disclosure provides a method to seal the edge of the tape so that the newly created tape, with a sealed edge, can be installed on the inside or the outside surface of the fabric panel. The present disclosure also allows the use of a single-side coated fabric to be used on air-holding structures.

Embodiments of the present disclosure provide an air- or gas-holding coating or film welded, laminated, integrated onto, integrated into, or attached to one or both sides of a reinforcing tape 22. Non-limiting examples of fibers that may be used to form the reinforcing tape portion 22 include but are not limited to polyamide (nylon), polyethylene terephthalate (PET), polyester, Ultra High Molecular Weight Polyethylene (Dyneema or Spectra), Polypropylene, Cotton, Carbon, Glass Meta-aramid material like Nomex, Para aramid material like Kevlar, Liquid crystalline polymers (such as Vectran), and combinations thereof. In another embodiment, the reinforced seam tape unsealed edge 26 is pre-coated or sealed using one or more of extrusion, coating, lamination, dip coating, laser cutting and/or sealing, and heat fusing. This may be done before the air-holding film is applied over or laminated thereto. The fibers may be any woven, nonwoven, knitted, or film-based substrate, any combinations thereof, or any other appropriate materials.

Non-limiting examples of materials for the air-holding film (whether 24, 32, or 34) for sealing, coating, laminating, or extrusion include but are not limited to: Polyurethane, vinyl, polyethylene, polypropylene, polyamides, polyethylene terephthalate (PET), polystyrene, ethylene vinyl acetate (EVOH), polyvinylidene chloride (PVDC), polyvinyl alcohol (PVOH), polycarbonate (PC), polyvinyl chloride (PVC), Polylactic acid (PLA), or any other appropriate polymer, or combinations thereof.

Possible welding methods include but are not limited to thermal welding, heat or hot air welding, heated wedge welding, heated roller (or rotary wheel) welding, hot stamped welding, radiofrequency (RF) welding, ultrasonic welding, combinations thereof, or any other appropriate welding method. All of these options are generally referred to herein as "welding." The term "welding" is used herein to refer to any methods or steps that cause two similar or dissimilar materials to flow into one another.

In one embodiment, the width of the reinforcement tape portion 22 may be about 1.5 inches, but tape widths greater or less than 1.5 inches are possible and are considered within the scope of this disclosure. In most embodiments, the air-holding layer (24, 32, or 34) should be at least partially wider than the reinforcement tape portion 22.

In one embodiment, the air-holding layer 24 thickness is 16 mil. Film thickness greater or less than 16 mil are possible and is considered within the scope of this disclosure. For example, possible thickness ranges include but are not limited to 1 mil to 20 mil or any thickness therebetween.

It should be understood that different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. An inflatable evacuation slide or raft, life raft, life vest, or other inflatable life-saving device, comprising:

a first panel and a second panel, the first panel and the second panel each comprising a panel surface;
a seat tape comprising:
   a first air-holding layer comprising a first surface and a second surface opposite from the first surface, wherein the first air-holding layer extends only on one side of the panel surfaces and with the first surface contacting the panel surfaces;
   a reinforcement seam tape portion comprising a substrate with a first surface, a second surface opposite from the first surface of the reinforcement seam tape portion, and one or more unsealed side edges, wherein the reinforcement seam tape portion extends only on the one side of the panel surfaces; and
   a second air-holding layer (i) applied over or laminated to the second surface of the reinforcement seam tape portion, (ii) applied over and laminated to the one or more unsealed side edges of the reinforcement seam tape portion, and (iii) applied extending only on the one side of the panel surfaces and sealing the one or more unsealed side edges of the reinforcement seam tape portion, preventing gas from traveling through the substrate along a same plane as the one or more unsealed side edges of the reinforcement seam tape portion,
   wherein the seat tape comprises a tensile strength of at least 190 pounds per inch.

2. The inflatable evacuation slide or raft, life raft, life vest, or other inflatable life-saving device of claim 1, wherein the reinforcement seam tape portion is a laminate of at least the reinforcement seam tape portion and the second air-holding layer to form a single strip.

3. The inflatable evacuation slide or raft, life raft, life vest, or other inflatable life-saving device of claim 1, wherein the reinforcement seam tape portion is a first reinforcement seam tape portion, wherein the inflatable evacuation slide or raft, life raft, life vest, or other inflatable life-saving device further comprises a second reinforcement seam tape portion, and wherein the second reinforcement seam tape portion extends in a transverse direction relative to the first reinforcement seam tape portion and forms a seam crossover.

4. The inflatable evacuation slide or raft, life raft, life vest, or other inflatable life-saving device of claim 1, wherein the first panel and the second panel each further comprise an air-holding coating on the panel surface, and wherein the first air-holding layer is applied to the air-holding coating on the panel surfaces.

5. The inflatable evacuation slide or raft, life raft, life vest, or other inflatable life-saving device of claim 1, wherein the panel surfaces are inside surfaces of the inflatable evacuation slide or raft, life raft, life vest, or other inflatable life-saving device.

6. A seam tape for an inflatable device, comprising:
   a reinforcement seam tape portion comprising a substrate with (i) a plurality of reinforcing fibers, (ii) a first surface, (iii) a second surface opposite from the first surface, and (iv) one or more unsealed side edges between the first surface and the second surface; and
   a separate air-holding layer on the first surface of the substrate and on the one or more unsealed side edges, wherein the separate air-holding layer fully encapsulates the reinforcing fibers to cover and to form a seal around and enclose the one or more unsealed side edges of the reinforcement seam tape portion in use, and
   wherein the seam tape comprises a tensile strength of at least 190 pounds per inch.

7. The seam tape of claim 6, wherein the reinforcement seam tape portion is a laminate of the reinforcement seam tape portion and the separate air-holding layer to form a single strip.

8. A sealing system comprising a first seam tape according to claim 6 and a second seam tape according to claim 6, wherein the first seam tape is positioned along a longitudinal seam and wherein the second seam tape is positioned along a transverse seam in order to form a seam crossover.

9. The seam tape of claim 6, wherein the seam tape is applied to an inflatable device that has an air holding coating on a first side, on a second side, or on both sides.

10. The seam tape of claim 6, wherein the seam tape is applied to an inside surface of an inflatable device.

11. A seam tape for an inflatable device, comprising:
   a reinforcement tape comprising a substrate, the substrate comprising a plurality of reinforcing fibers, the reinforcement tape having one or more unsealed side edges, an upper surface, and a lower surface, wherein the one or more unsealed side edges extend from the upper surface to the lower surface; and
   a separate air-holding coating or film applied on the one or more unsealed side edges of the substrate to cover, enclose and to form a seal around the one or more unsealed side edges of the reinforcement tape portion in use, and
   wherein the seam tape comprises a tensile strength of at least 190 pounds per inch.

12. The seam tape of claim 11, wherein the seam tape is used to weld two panels together.

13. The seam tape of claim 11, wherein a butt seam is used.

14. The seam tape of claim 11, wherein the seam tape is a laminate of the reinforcement tape and the separate air-holding coating or film to form a single strip.

15. A sealing system comprising the seam tape of claim 11 as a first reinforcement seam tape, wherein the sealing system comprises a second reinforcement seam tape, wherein the first reinforcement seam tape is positioned along a longitudinal seam and wherein the second reinforcement seam tape is positioned along a transverse seam in order to form a seam crossover.

16. The seam tape of claim 11, wherein the seam tape is applied to an inflatable device that has an air holding coating on a first side, on a second side, or on both sides.

17. The seam tape of claim 11, wherein the seam tape is applied to an inside surface of an inflatable device.

* * * * *

UNITED STATES PATENT AND TRADEMARK OFFICE
CERTIFICATE OF CORRECTION

PATENT NO. : 11,964,463 B1
APPLICATION NO. : 16/504962
DATED : April 23, 2024
INVENTOR(S) : Christian W. Thomson et al.

Page 1 of 1

It is certified that error appears in the above-identified patent and that said Letters Patent is hereby corrected as shown below:

In the Claims

Column 7, Line 3: In Claim 1, delete "seat tape" and insert --seam tape--.
Column 7, Line 26: In Claim 1, delete "seat tape" and insert --seam tape--.

Signed and Sealed this
Sixth Day of May, 2025

Coke Morgan Stewart
*Acting Director of the United States Patent and Trademark Office*